W. C. L. LEFELDT & C. G. O. LENTSCH.
Centrifugal Machine for Creaming Milk.
No. 218,753.                    Patented Aug. 19, 1879.
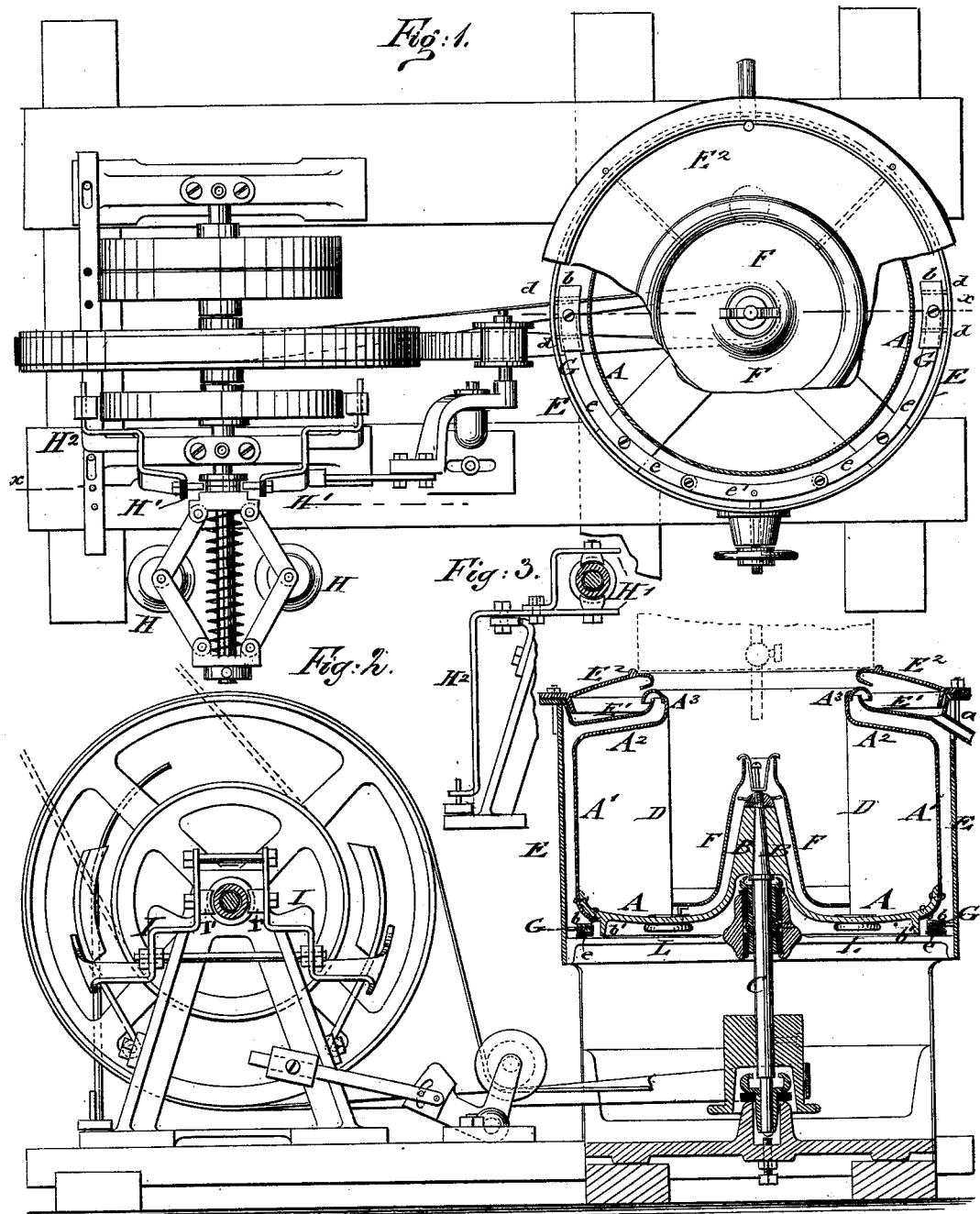
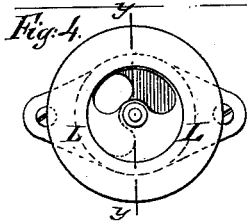

UNITED STATES PATENT OFFICE.

WILHELM C. L. LEFELDT AND CARL G. O. LENTSCH, OF SCHOENINGEN, GERMANY.

IMPROVEMENT IN CENTRIFUGAL MACHINES FOR CREAMING MILK.

Specification forming part of Letters Patent No. 218,753, dated August 19, 1879; application filed July 9, 1878.

*To all whom it may concern:*

Be it known that we, WILHELM C. L. LEFELDT and CARL G. O. LENTSCH, of Schoeningen, in Germany, have invented a new and Improved Centrifugal Machine for Creaming Milk, of which the following is a specification.

The object of this invention is to so improve the machine for creaming milk by centrifugal power for which Letters Patent have been granted to us, dated September 25, 1877, and numbered 195,515, that the separation of the cream from the milk takes place continuously during the running of the machine without requiring the stopping of the same, and that the machine may be operated with hardly any vibratory motion of the centrifugal drum, and without explosion or other accidents to which centrifugal machines are usually liable.

The invention is more especially designed to render the motion of the machine during its entire course smooth and uniform, without making its construction more complicated or its working more difficult. This is accomplished by avoiding the more or less violent shocks or irregularities of the revolving drum that take place with nearly all the different brake devices hitherto employed, and by so regulating the starting and speed of the machine, whether driven by steam or animal power, that a too high speed and liability to accidents are prevented.

The invention consists in the combination, with a revolving drum having flanged top with annular inwardly-bent rim, of a circular collecting-trough of the outer jacket or casing, said trough having a discharge-spout and a cover with extension ledge or seat; and in the combination of a revolving drum and its driving-shaft with a centrifugal governor and suitable means for shifting the belt or applying the brakes, all as hereinafter described.

Referring to the drawings, Figure 1 represents a top view, partly in section, of our improved centrifugal machine for creaming milk. Fig. 2 is a vertical longitudinal section of the same on line $x\ x$, Fig. 1; Fig. 3, a detail side view, partly in section, through the driving-shaft, showing the improved belt-shifting device operated by the governor; and Figs. 4 and 5 are, respectively, a detail bottom view and a vertical central section on line $y\ y$, Fig. 4, of the improved discharge-valve of the revolving drum.

Similar letters of reference indicate corresponding parts.

Referring to the drawings, A represents a cylinder or drum, of suitable material, which is poised by a central conical bearer, B, at the upper conical end of a vertical spindle, C. The conical bearer B is cast in one piece with the bottom of the drum, and connected with the driving-lugs of the spindle, so as to be revolved thereby.

The drum is made of a solid cylinder, $A^1$, that is riveted to the bent-up outer circumference of the bottom part by two rows of rivets, of which the upper row is exposed to shearing strain, while the lower set is exposed to cutting strain, the effect of these two rows of rivets, of which the upper are in horizontal, the lower in vertical position, being to impart to the revolving drum the required stiffness and rigidity, and thereby increase the security against explosion and accident.

The cover $A^2$ may be secured permanently or detachably to the drum $A^1$, and provided with an upwardly-extending flange, to which an annular outwardly and downwardly curved rim, $A^3$, is secured, either by screws, bayonet-lock, or in other suitable manner.

The drum is divided by radial partitions D into a number of sections, and inclosed by a safety jacket or casing, E, which carries a stationary trough, $E^1$, that extends below the annular rim of the drum, and has a fixed or detachable top flange or cover, $E^2$, as shown clearly in Fig. 2.

The trough $E^1$ is provided with an exit-spout, $a$, through which the cream that is separated from the milk by the centrifugal force and driven up along the wall and cover of the drum, and finally passed over the rim into the trough, is discharged into a suitable receptacle.

The cover $E^2$ of the jacket E is bent down and back at its inner edge, so as to be close to the annular rim of the drum.

An exterior ledge or rib of the cover $E^2$ serves to support thereon a reservoir with bottom discharge pipe and cock, through which the milk is admitted into the drum during the revolving of the same.

The milk is dropped from the bottom pipe into a conical distributing-diaphragm, F, with horizontal bottom extension, that is retained at suitable distance on the center bearer B and from the bottom of the drum. The revolving of the drum spreads the milk over the surface of the sheet-metal distributer or diaphragm, and conducts it in a thinly-divided sheet to the bottom of the drum. In this manner the milk may be supplied continuously during the revolving of the machine, and the cream separated at the same time by centrifugal action of the drum, and drawn off continuously through the connecting-trough of the jacket. As soon as blue milk appears at the discharge-spout of the trough the creaming of the milk is completed, the supply has to be interrupted, and the drum has to be stopped by disconnecting its driving-belt from the driving-shaft, and gradually applying the brake device to the drum.

The upper and lower bearings of the spindle are constructed in a manner analogous to those shown in our former patents, with the difference, however, that in the upper bearing a rubber sleeve in place of a ring is employed for taking up the oscillations of the spindles and preventing their transmission to the drum. The lower section of the jacket is cut out at opposite points for the driving-belt, and for giving room for the vessels that receive the contents of the drum.

In connection with the drum is used, for the purpose of gradually stopping the motion of the same, a brake device, G, that consists of two brake-shoes, $b$, which bear on a bottom flange, $b'$, of the drum at diametrically opposite points, the shoes being curved at their faces so as to correspond to the curvature of the flange, and covered with felt or other suitable fabric.

The brake-shoes are guided on fixed horizontal pins $d$ of the jacket, and operated by means of arc-shaped lever-arms $e$, that are fulcrumed to the radial arms or braces that connect the upper spindle-bearing with the jacket. The lever-arms $e$ are again pivoted to a center-piece, $e'$, to the center of which a pivoted screw-rod is applied, that extends through the casing and is acted upon by a hand-wheel, for the purpose of applying or removing the brake by turning the hand-wheel forward or back. The connecting lever-arms $e$ then transmit the motion imparted to the center-piece $e'$ to the brake-shoes $b$, and apply them to the flange of the drum, so as to gradually stop the same by the friction exerted therewith. The diametrical position of the brake-shoes prevents any change of the position of the spindle from its vertical position, and avoids therefore any oscillation of the drum or unequal motion of the same.

Another important factor in keeping up a regular and uniform speed of the drum is furnished by applying a centrifugal governor, H, to one end of the extended driving-shaft. This governor may be of any improved construction, and is connected, in case the machine is driven by belt-and-pulley arrangement, with a belt-shifting device, $H^1$, that is actuated by the sliding and flanged sleeve of the governor and by a fulcrumed connecting-arm, $H^2$, as shown in Figs. 1 and 3.

A sudden increase of speed will cause the flying out of the governor-balls, and thereby the shifting of the belt from the transmitting-pulley, by the laterally sliding shifting-bar, onto the loose pulley, and, vice versa, the diminishing of the speed the reshifting of the belt back to the fixed drive-pulley. The governor regulates in this manner the motion of the drum.

If in place of the pulley-and-belt transmission a direct motive-power, such as animal or other power, is used, the governor is connected by means of fulcrumed arms I with brake-shoes $I'$, that are applied to the fixed pulley of the driving-shaft, as shown in Figs. 1 and 2. Whatever be the power employed, the general arrangement of the governor and the bearings of the driving-shaft remain the same.

The use of the governor, in connection with a shifting or brake mechanism, prevents any irregularities in the transmission of motion, produces less wear and tear of the machine, and furnishes a safeguard against accidents to the machine. The driving-belt is tightened in the usual manner by an idler that is applied by means of an elbow-lever with adjustable weight, so that the tension may be regulated as desired.

The bottom of the revolving drum A is arranged with one or more discharge-valves, L, which are made of two sections, as shown in Figs. 4 and 5, both with central conical parts, one section being let in the bottom of the drum, the other movable section being connected by a center-bolt to the fixed section.

One-half of each valve-section is broken out, so that when the openings of both sections register the contents of the drum may be drawn off; but when the movable section is turned until the openings are disconnected, the valve is then tightly closed, owing to the accurate grinding and intimate connection of the conical faces of the sections. The flat shape of the valve produces, during the revolving of the drum, no resistance, while the valve may be readily taken apart for cleaning or repairing it, furnishing, also, owing to its conical shape, a funnel-shaped discharge-opening for the blue milk and water used for cleaning the drums.

The stopping of the machine during the operation is by our improvements entirely avoided, and a continuous separation of the cream obtained as it is driven over the rim into the stationary trough during the running of the drum.

The apparatus may be readily cleaned in all its parts, as the interior partitions and milk-distributer are detachable, and as the water may be finally drawn off through the bottom valves. In this manner a more effective machine is obtained, by which nearly twice the quantity of milk may be worked off in the same time as compared to our former machine with intermittent motion.

We are aware that it is not new to use a revolving drum, conical distributing diaphragm, and brake-shoes with lever.

Having thus described our invention, we claim as new and desire to secure by Letters Patent—

1. The combination, with a revolving drum having a flanged top with annular outwardly-bent rim, and a circular collecting-trough of the outer jacket or casing, said trough having a discharge-spout and a cover with exterior ledge or seat for the support of the milk-reservoir, substantially as set forth.

2. The combination, in a centrifugal creaming-machine, of a revolving drum and its driving-shaft with a centrifugal governor and suitable means for shifting the belt and applying the brakes for regulating the speed of the drum, substantially as set forth.

The above specification of our invention signed by us this 25th day of March, 1878.

W. C. L. LEFELDT.
C. G. O. LENTSCH.

Witnesses:
WILLIAMS C. FOX,
JOHS. KRACKE.